United States Patent Office 2,928,378
Patented Mar. 15, 1960

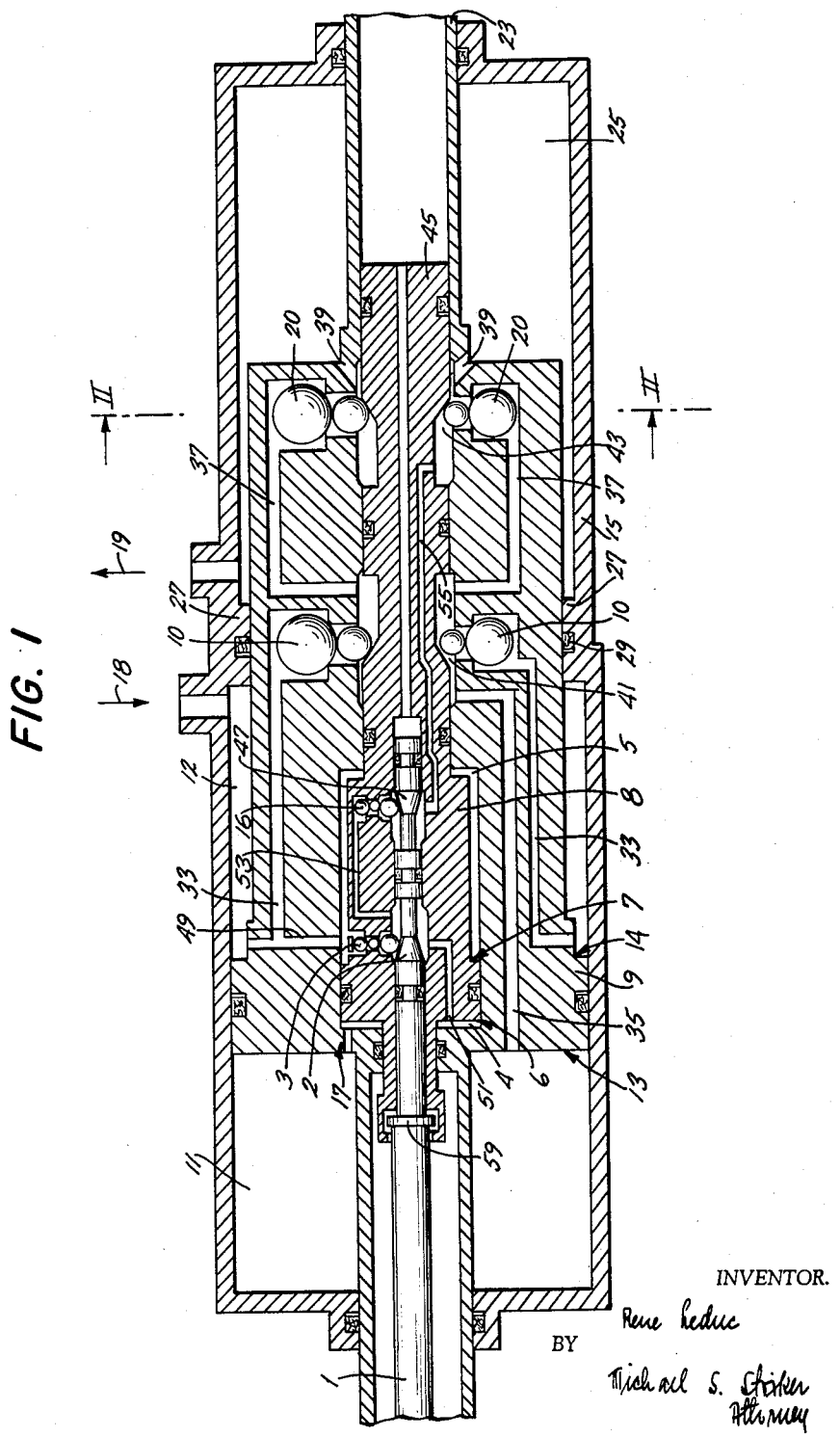

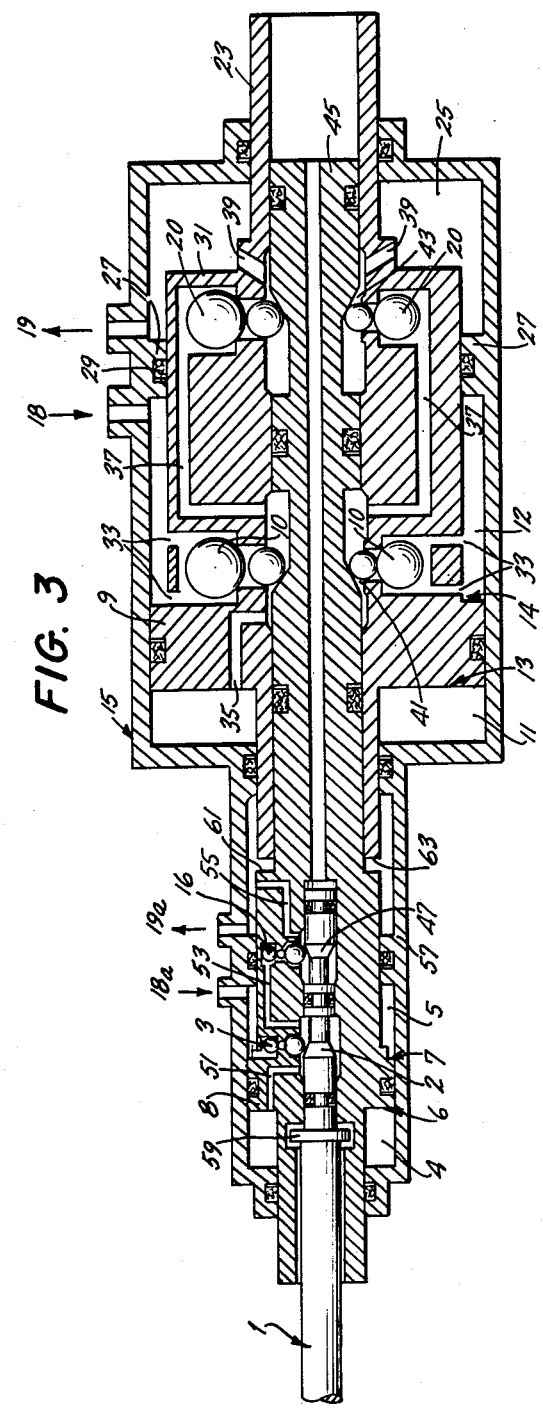
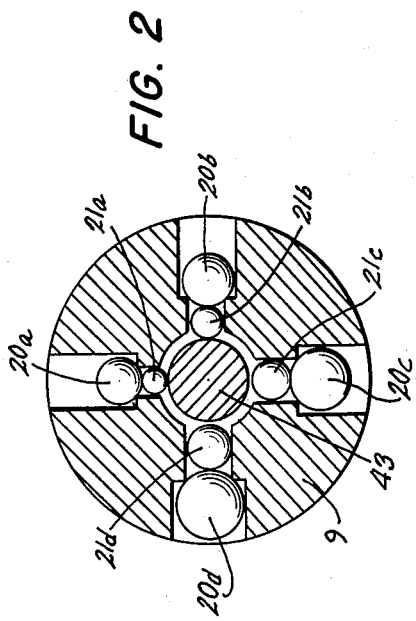

2,928,378

FLUID PRESSURE SERVO-MOTOR

René Leduc, Le Vesinet, France

Application May 6, 1958, Serial No. 733,350

Claims priority, application France May 7, 1957

14 Claims. (Cl. 121—41)

This invention relates to fluid-pressure servo-motors, more especially for operating various services in aircraft, among which the flying controls are perhaps the most important; but the invention is of general application to various duties.

A servo-motor for operating the flying controls of a high-performance aircraft must satisfy very exacting requirements and to a greater or less extent the same requirements may have to be satisfied by servo-motors for performing other duties according to the nature of their application.

The objects of the invention include a servo-motor operated by fluid pressure, i.e. hydraulic or pneumatic, satisfying the following requirements among others:

(a) Accurate positional correspondence of the controlled and controlling members, i.e. minimal lost motion between them;

(b) Rapidity of response, i.e. small time-constant, measured by the time required for the controlled member to attain about two-thirds of the desired speed of movement;

(c) Extreme sensitivity, implying a high effort-multiplying ratio;

(d) Minimal break-out effort of the controlling member, by reduction to a minimum of parasitic forces, which are mainly composed of (i) friction, and (ii) the effort required to actuate the valves;

(e) Stability, i.e. "dead-beat" operation with substantially no "hunting" during movement;

(f) Starting and stopping of rapid control movements substantially without shock;

(g) Substantially leak-proof valves.

With regard to these requirements (c) is of especial importance when the controlling member is to be operated by an automatic pilot or stabilizing device, or more generally by any device responsive to conditions set up by the action of the controlled member, so as to create a "control loop": (d, i) "friction" can be to a large extent eliminated or compensated by known methods: and (g) is important for two reasons; firstly to ensure continued operation under accumulator pressure, in the event of a pump failure, for long enough to avoid serious consequences; in an aircraft, for instance, the system may have to function in these conditions for an hour or more in order to ensure a safe return to base; and secondly, because valve leakage causes severe turbulence and scrubbing of the fluid in the passages and pipe lines of the system and consequent over-heating.

In practice, requirements (a), (b), (d, ii) and (g) at least can only be satisfactorily met by the use of ball-valves, for instance as described in my United States Patent No. 2,574,335. Sliding valves have excessive lost motion, are sluggish, and can only be made substantially leak-proof with very great difficulty and at the cost of introducing unacceptable parasitic forces. My improved servo-motor therefore uses ball valves throughout.

To achieve the foregoing objects and more especially to meet the most exacting standards of requirements (d, ii), (e) and (f) above stated, my invention provides an improved form of ball-valve assembly, actuated by a cone or inclined surfaces on the controlling member, comprising a series of ball valves having seatings of different areas, the balls of which are successively unseated and re-seated on displacement of the cone or inclined surfaces in the appropriate sense, in the order of progressively increasing and decreasing seating areas respectively.

The progressive application of the valve-actuating effort reduces not only the peak effort required and therefore the parasitic force, but especially the initial effort required and hence the break-out force of the controlling member; and the progressive increase of valve port area when the valve is being opened causes the flow of fluid through the valve and hence the speed at which the controlled member moves, to be slow at first and to accelerate progressively until it reaches that of the controlling member. Conversely, when the valve is being closed, the initial deceleration of the controlled member is high and becomes progressively less. The result of this is that the controlled member is set in motion and arrested substantially without shock and its movement is substantially dead-beat.

For the attainment of the foregoing objects in the highest possible degree, and more especially with requirements (c) and (d, ii) above stated in view, the objects of my invention further include a two-stage servo-motor of which the second or "power" stage actuating the controlled member has the improved ball-valve assemblies as described above and the controlling member of the second stage is the controlled member of the first stage, which is in turn controlled by a primary controlling member and has simple ball valves of which the balls and their lift are exceedingly small, and consequently the effort required of the primary controlling member and the lost motion between it and the controlled member (of the first stage) are likewise very small.

My invention includes further features and characteristics which will appear in and be more fully understood from the following description having reference to the accompanying drawings, which illustrate, by way of example only and without implied limitation of the scope of the invention, which is defined in the hereto appended claims, a typical embodiment of the invention and modification thereof. In the drawings, Figure 1 is a schematic longitudinal section of a hydraulic servo-motor embodying the invention;

Figure 2 is a transverse section on the line II—II of Figure 1; and

Figure 3 is a view, similar to Figure 1, illustrating a modification.

Referring to Figure 1, the servo-motor comprises an outer fixed casing 15, a longitudinally displaceable control rod 1 and a longitudinally displaceable controlled member 23. Casing 15 constitutes the cylinder of a power jack, whose piston 9 is integrally connected to the member 23. The casing 15 has an inlet 18, by which liquid under pressure is supplied to an annular space 12 to the right of piston 9, and an outlet 19, through which the liquid is exhausted from a space 25, at the right hand end of the casing 15, separated from the space 12 by an internal web 27 of the casing, having a fluid-tight seal 29 through which an integral extension 31 of the piston 9 slides.

The action of the power jack is controlled by ball-valve assemblies 10, 20 housed in the piston extension 31. Valve assembly 10 controls communication between the space 12, which is always under the supply pressure, via galleries 33, 35, formed in the piston body 9, 31, and the space 11 to the left of the piston 9; and valve assembly 20 controls communication, via galleries 35 and other galleries 37 and ports 39 formed in the piston body 9, 31, between space 11 and space 25 which is always at exhaust pressure.

The valve assemblies 10, 20, are actuated by cones 41, 43 formed on a rod 45, which slides in an axial bore of the piston 9 and is provided with fluid-tight seals as shown. The left hand end of rod 45 is enlarged and forms the piston 8 of a pilot jack whose cylinder is an enlarged portion of the said axial bore. The pilot jack is controlled by ball-valves 3, 16, housed in the piston 8 and actuated by cones 2, 47, formed on the control rod 1, which slides in an axial bore of the piston 8. The cylinder space 5 of the pilot jack, to the right of the piston 8, is always in communication with the annular space 12, which is under the supply pressure, via a gallery 49 formed in the piston 9; and galleries 51, 53 formed in piston 8 provide communication between the space 4 to the left of piston 8 and the valves 3, 16. Valve 3 controls communication between space 4 and space 12, via gallery 49; and valve 16 controls communication between space 4 and space 25, via another gallery 55 formed in rod 45 and the ports 39. A calibrated port 17 in the piston 9 provides intercommunication between the spaces 4 and 11 and tends to equalise the pressures in these spaces.

The whole thus far described constitutes a two-stage servo-motor, of which the first stage comprises the control rod 1, valves 3, 16 and pilot jack 8, 9, and the second stage comprises the rod 25, valves 10, 20 and power jack 9, 15.

The valves 3, 16 are shown as comprising three balls each, viz. an upper ball which engages the seating and forms the closure member, a lower ball which is displaced by the cone and an intermediate ball which transmits the movement of the lower ball to the upper ball. The lower and intermediate balls could be replaced by a push-rod.

The valve assemblies 10, 20, are identically similar. Referring to Figure 2, the assembly 20, as therein illustrated, comprises a series of valve balls 20a, 20b, 20c, 20d of progressively increasing diameter engaging seatings of correspondingly progressive areas. The intermediate balls 21a, 21b, 21c, 21d which could be replaced by push-rods, are displaceable by the cone 43 to unseat the balls 20a to 20d. The diameters of balls 21a to 21d and the distances from the axis of the cone 43 of the seatings of the balls 20a to 20d are so selected that as the cone 43 moves axially in the sense to unseat the balls 20a to 20d, these balls are unseated in succession according to progressive increase of their diameters beginning with the smallest one 20a. When the cone 43 is moved in the opposite sense, the largest ball 20a is seated first and the progressively smaller balls in succession.

Since the rapidity with which the controlled member 9, 23, can move in response to an "order" given by the controlling member 45 depends on the rate at which the liquid can flow through the valve-assembly 10 or 20 and this flow-rate is mainly determined by the valve port area, it follows that, with the valve arrangement described above, when a control action is initiated the responsive movement of the controlled member starts slowly but with rapidly increasing acceleration until all four balls 20a to 20d are unseated, at which instant the speed of the controlled member attains a maximum; and that when the control action finishes, the controlled member decelerates rapidly at first, but at a progressively decreasing rate, its final deceleration to a standstill being quite gentle. This characteristic of progressive acceleration and deceleration ensures that the initial and peak efforts required of the controlling member are considerably reduced and that very rapid control movements can be initiated and arrested without shock. In conjunction with the action of the calibrated port 17, which limits the speed of the controlling member 8, 45 relatively to the controlled member 9 when taking up the lost motion required for unseating or reseating the balls 20a to 20d, the progressive acceleration and deceleration characteristic ensures that the response of the controlled member is substantially dead-beat. The lost motion-travel of the controlling member relatively to the controlled member is very small and consequently the duration of the accelerating and decelerating phases of the controlled member's motion is correspondingly short and normally will not exceed a few tenths of a second at most. The servo-control is therefore extremely sensitive and has a very small time-constant.

The modified embodiment illustrated in Figure 3 is in most respects similar to the embodiment of Figure 1, like parts being denoted by like reference characters. It differs in that the pilot jack cylinder in which the piston 8 slides is constituted, not by the power piston 9, as in Figure 1, but by an extension 57 of the fixed casing 15 provided with independent inlet 8 exhaust ports 18a, 19a. In the modification of Figure 3, means of intercommunication between spaces 4 and 11, such as the calibrated port 17 of Figure 1, is not shown, but could easily be provided, e.g. by means of an external pipe.

The operation of the embodiments of Figures 1 and 3 will now be described.

In the rest position, the ball valves 3, 16, 10, 20, are closed and prevent the spaces 4 and 11 from communicating with either the supply 18 or the exhaust 19, thus creating a hydraulic lock in these spaces, which prevents the pistons 8, 9, from being displaced by the supply pressure constantly applied to spaces 5, 12.

When the control member 1 is displaced, for instance to the right as seen in Figure 1, valve 3 is opened and admits the supply pressure to space 4 since the area of the face 6 of piston 8 next to space 4 is greater than that of piston face 7 next to space 5, piston 8 is moved to the right to follow the movement of member 1, relatively to piston 9. Consequently, cone 41 successively unseats the balls 10a to 10d of valve 10 to admit the working fluid, under the supply pressure, at a progressively increasing rate, from space 12 to space 11. Since the area of face 13 of piston 9 next to space 11 is greater than that of piston-face 14 next to space 12, piston 9 is moved to the right to follow piston 8.

As long as member 1 continues to be displaced, piston 8 with its extension 45 will continue to follow it, and piston 9 with its extension 23 will continue to follow piston 8.

When member 1 is arrested, piston 8 will overrun it, by a very short distance only, causing valve 3 to close thereby arresting piston 8 and extension 45. Piston 9 and its extension 31 will then overrun piston 8, again by a very small distance, causing the balls 10d to 10a to be seated progressively, thus decelerating piston 9 to a standstill at a progressively decreasing rate, thereby re-establishing the rest condition in which pistons 8, 9, are hydraulically locked.

Similarly, when member 1 is moved to the left, valves 16 and 20 are successively opened to put spaces 4 and 11 successively into communication with the exhaust 19, with the result that piston 8 and its extension 45 and piston 9 with its extension 23 are caused to follow the leftward movement of member 1 until the latter is arrested, when valves 16 and 20 close successively to arrest pistons 8, 45 and 9, 23 and re-establish the hydraulically locked rest condition.

Any tendency of pistons 8 and 9 to overrun member 1 and piston 8 respectively during the displacement of member 1, is self-compensating, since it will tend to close the valves 3 and 10, or 16 and 20 respectively, according to the sense of the displacement. The members 8, 45 and 9, 23 therefore follow the movements of the control member 1 smoothly and stably, in the sense that hunting is substantially suppressed.

What is known in aircraft control applications as

"manual reversion" in the event of fluid pressure failure is provided for by means of a collar 59 on the control member 1 engageable, with small lost motion, with opposed abutments in the pilot jack piston 8, 45 and by the fact that in the embodiment of Figure 1 the piston 8 has only limited travel between the heads of its cylinder formed in piston 9; in the embodiment of Figure 3 travel of piston 8 relatively to piston 9 is limited in one direction by interengagement of complementary abutments 61,63 and in the other by jamming of the cone 43 with the balls of the valve assembly 20, in lieu of which complementary abutments (not illustrated) similar to 61, 63, but acting in the reverse sense could easily be provided.

Although the foregoing particular description of typical embodiments of the invention refers throughout to an hydraulic servo-motor system, these embodiments could be adapted without material alteration, except in details not necessarily requiring the exercise of inventive ingenuity, to a pneumatic system.

The scope of the invention is not limited in respect either of the means employed for actuating the primary controlling member, such as 1 in Figures 1 and 3, or of the duty to be performed by the controlled member, such as 23. For instance, member 1 may be actuated, either directly, or through a suitable mechanical, hydraulic, pneumatic, electrical or electronic linkage, by human agency; or, in the case of an aircraft installation, by an automatic pilot or stabilising device, or, more generally, by any device responsive to conditions set up by the action of the controlled member so as to complete a "control loop." Likewise, the controlled member, such as 23 (Figures 1 and 3) may perform various duties. In an aircraft installation, for instance, it may actuate a flying control member or members, e.g. elevator, rudder, ailerons, spoilers, or flaps, or undercarriage retraction mechanism, wheel brakes, or other services. In applications other than to aircraft, the controlled member may perform various duties according to the nature and purpose of the installation.

In carrying this invention into practice in accordance with either of the embodiments illustrated in Figures 1 and 3 respectively, the following dimensional limitations may preferably be observed, at least in aircraft control applications:

(i) The diameter of the operative (seating-engaging) balls of the valves 3 and 16 should not exceed 1 mm.;

(ii) The area of face 6 of piston 8 should not exceed 0.5 cm.$^2$, with these limitations the maximum effort required of the controlling member or rod 1 can be reduced to no more than a few grams.

(iii) The dimensions of the operative balls of the valve assemblies 10 and 20 and the valves 3 and 16 and of the cones 41, 43 and 2, 47, which respectively actuate them should be so selected that the lost-motion, which must be taken up between rod 1 and piston 8 to produce a given instantaneous speed of displacement of the latter, should not exceed one quarter of the corresponding lost motion which must be taken up between piston 8, 45 and piston 9 to produce the same instantaneous speed of displacement of the latter.

It is to be understood that the invention further includes all such modifications of the structures particularly described with reference to the accompanying drawings as are within the competence of those skilled in the art and do not depart from the scope of the invention as defined in the hereto appended claims.

I claim:

1. A pressure-fluid operated servo-motor comprising a power jack, a controlled member actuated thereby and a controlling member, said jack including a cylinder having an inlet for pressure-fluid and an exhaust outlet, a piston unitary with said controlled member, and ball-valve assemblies housed in said piston, said controlling member being displaceable axially of said cylinder and piston and having inclined surfaces for actuating the ball valve assemblies to control the application of fluid pressure to said piston in such a way as to cause said piston and controlled member to follow the movements of said controlling member, each of said ball valve assemblies comprising a number of valve pockets each having a ball-seating therein, a valve ball seatable on each such seating and intermediate members displaceable by said inclined surfaces to unseat said balls, the areas of said ball seatings being all different and said intermediate members so dimensioned with respect to the positions of said ball seatings that displacement of said last-named inclined surfaces relatively to said piston causes the several balls to leave their seatings successively in the order of progressively increasing seating area and to return to their seatings successively in the reverse order.

2. A pressure-fluid operated linear servo-motor comprising a body in which is formed a power cylinder and an inlet and an outlet for the fluid, a power piston displaceable in said cylinder and defining a first and a second cylinder space, the latter communicating freely with said inlet and the effective area of the piston face in said first space being greater than that of the opposite piston face in said second space, ducting formed in said piston interconnecting said first and second spaces, a ball valve assembly controlling flow through said ducting, other ducting formed in said piston interconnecting said first space and said outlet, a second ball valve assembly controlling flow through said other ducting, a controlling member axially slidable in said piston and having two cones formed thereon for actuating said first and second ball valve assemblies respectively, each said ball valve assembly comprising a number of pockets disposed radially in said piston, each such pocket having a ball-seating of a different area, a ball seatable on each such seating and a push member interposed between each such ball and a ball valve assembly actuating cone, the several such push-members being so dimensioned relatively to the radial distances of the several seatings from the piston axis that on axial displacement relatively to the piston of said last-named cone the several balls are unseated in the order of increasing area of their respective seatings and seated in the reverse order.

3. The servo-motor defined in claim 2, wherein said body comprises a third space communicating freely with said outlet and means isolating said third space from said second cylinder space, said other ducting in the piston communicating freely with said third space.

4. The servo-motor defined in claim 1 comprising further a pilot jack actuating said controlling member and having means for admitting and exhausting the working fluid, ball-valve means controlling the application of fluid pressure in said pilot jack to displace said controlling member in either sense relatively to said piston and a second controlling member displaceable relatively to said pilot jack and having inclined surfaces for so actuating said ball-valve means as to cause the first-named controlling member to follow the movements of said second controlling member.

5. A two-stage fluid-operated servo-motor comprising a body in which is formed a power cylinder and an inlet and an outlet for the fluid, a power piston displaceable in said cylinder and defining a first and a second cylinder space, the latter communicating freely with said inlet and the effective area of the piston face in said first space being greater than that of the opposite piston face in said second space, ducting formed in said piston interconnecting said first and second spaces, a ball valve assembly controlling flow through said ducting other ducting formed in said piston interconnecting said first space and said outlet, a second ball-valve assembly controlling flow through said other ducting, an intermediate control member axially slidable in said piston and having two cones formed thereon for actuating said first and second ball-valve assemblies respectively, each said ball-valve assembly comprising a number of pockets disposed radially in said piston, each such pocket having a ball-seating of a different area, a ball seatable on each such seating and a push member interposed between each such ball and a ball-valve-assembly-actuating cone, the several such push-members being so dimensioned relatively to the radial distances of the several seatings from the piston axis that on axial displacement relatively to the piston of said last-named cone the several balls are unseated in the order of increasing area of their respective seatings and seated in the reverse order; said servo-motor further comprising a pilot jack including a cylinder having means for admitting and exhausting the fluid and a piston unitary with said intermediate control member, duct means formed in said last-named piston and ball-valve means housed in said last-named piston and controlling flow through said last-named duct means to supply and exhaust the fluid to and from one of the spaces in said last-named cylinder separated by said last-named piston, the other of such spaces communicating freely with the fluid admission means and the effective area of the pilot jack piston in the first-mentioned of said last-named spaces being greater than that in the other of such spaces, and a primary controlling member axially slidable in the piston of said pilot jack and having cones formed thereon for so actuating said ball-valve means as to cause the piston of the pilot jack and the said intermediate control member to follow the motions of the primary controlling member.

6. The servo-motor defined in claim 5, in which the ball-valve means comprise two valves, one controlling admission of fluid and the other exhaustion thereof to and from the first-mentioned of said pilot-jack-cylinder spaces, each such valve comprising a valve ball and at least one cone-engaging push-member.

7. The servo-motor defined in claim 6, in which the therein-mentioned valve balls have a diameter not greater than one mm.

8. The servo-motor defined in claim 6, in which the larger effective area of the pilot jack piston does not exceed 0.5 cm.$^2$.

9. The servo-motor defined in claim 5, in which the pilot jack cylinder is formed in the power piston.

10. The servo-motor defined in claim 5 in which the pilot jack cylinder is formed in the power piston and the latter has a calibrated port interconnecting the first space of the power cylinder and the first-mentioned space of the pilot jack cylinder.

11. The servo-motor defined in claim 5, in which the pilot jack cylinder is constituted by an extension of said body.

12. The servo-motor defined in claim 5, further including means providing for so-called "manual reversion" in the event of pressure-failure of the working fluid.

13. The servo-motor defined in claim 5, in which the ball valve assemblies, the ball-valve means and the cones formed on the intermediate control member and on the primary controlling member are all so dimensioned that the lost motion to be taken up between the primary controlling member and the pilot jack piston required to produce a given instantaneous speed of displacement of the latter is not more than one quarter of the corresponding lost motion which must be taken up between the intermediate control member and the power piston to produce the same instantaneous speed of displacement of the latter.

14. A fluid-pressure operated servo-motor comprising a controlling member, a controlled member and follow-up valve means, the latter including a number of ball-seatings of different sizes, a ball seatable on each seating and means responsive to relative displacement of the controlling and controlled members for unseating and seating said balls successively in the order respectively of increasing and decreasing size of their seatings.

References Cited in the file of this patent

UNITED STATES PATENTS

| | | |
|---|---|---|
| 2,503,956 | Lisle et al. | Apr. 11, 1950 |
| 2,574,335 | Leduc | Nov. 6, 1951 |
| 2,711,158 | Leduc | June 21, 1955 |
| 2,717,579 | Leduc | Sept. 13, 1955 |